Jan. 6, 1970   J. C. LITTMANN   3,487,704
WINDOW REGULATOR WITH FLEXIBLE SHAFT
Filed April 11, 1967
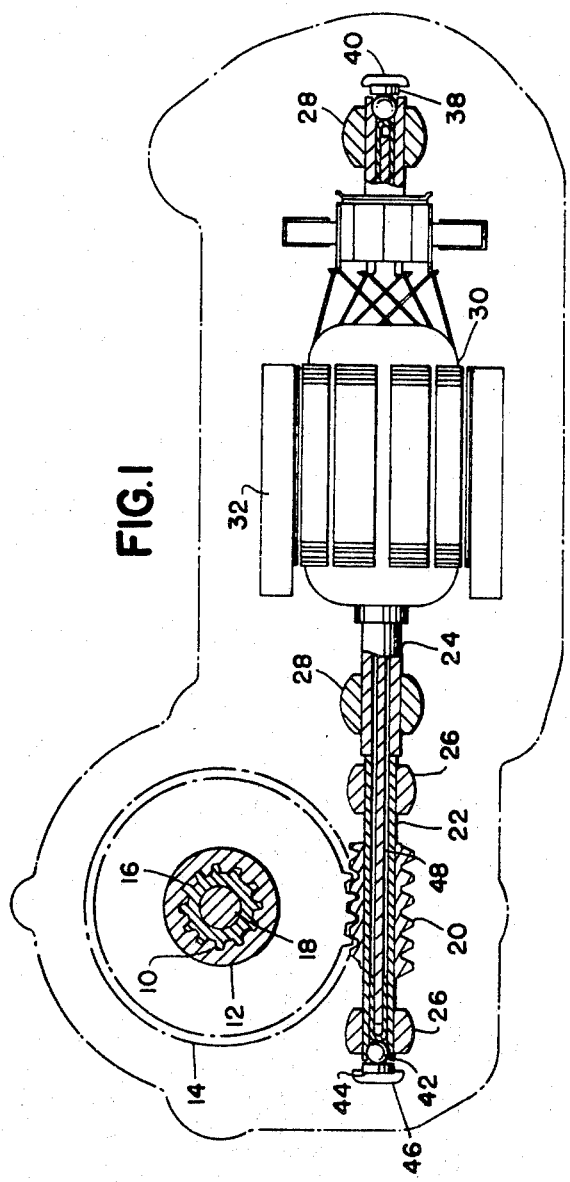
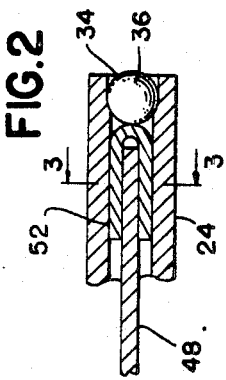
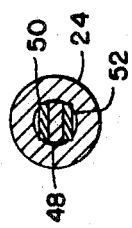
INVENTOR
JOSEPH C. LITTMANN
BY
ATTORNEYS

United States Patent Office 3,487,704
Patented Jan. 6, 1970

3,487,704
WINDOW REGULATOR WITH FLEXIBLE SHAFT
Joseph C. Littmann, Grosse Pointe Woods, Mich., assignor to Ferro Manufacturing Corporation, Detroit, Mich., a corporation of Michigan
Filed Apr. 11, 1967, Ser. No. 630,089
Int. Cl. F16h 29/20
U.S. Cl. 74—89.2      4 Claims

ABSTRACT OF THE DISCLOSURE

A window regulator for automobiles comprising a motor, a drive shaft composed of a plurality of aligned sections, a resilient torsion member interconnecting the sections at opposite ends of the shaft, and gearing at the output end of the shaft for connection to a window regulator.

CROSS-REFERENCE TO RELATED APPLICATION

This application is related to application Ser. No. 630,013, filed Apr. 11, 1967, directed to the motor and transmission housing associated with the present construction.

BACKGROUND OF THE INVENTION

In the past it has been recognized that when a direct drive is provided between the electric motor and the window, when the closing movement of the window is arrested, the full torque of the electric motor and the torque attributable to the flywheel of the armature are combined to produce excessive closing force. Moreover, where the transmission is to a worm driving a toothed sector the irreversibility of the worm traps the torque which produces excessive frictional loading which must be overcome on reversal of the motor. Accordingly, it has been the practice to provide resilient means in the transmission, and in the present invention a simplified and improved resilient transmission component is provided.

SUMMARY OF THE INVENTION

In accordance with the present invention the electric motor coupled by suitable transmission means to the window regulator includes a yieldable torsion coupling effective when movement of the window to closed position occurs, to yield to permit limited additional rotation of the motor. When the motor is de-energized the yieldable transmission allows reverse rotation of the armature, thus reducing the frictional locking effect and permitting initial opening movement of the window to occur under more reduced load conditions than would otherwise be necessary.

It is an object of the present invention to provide, in a transmission of the character described, a motor having a hollow shaft formed of at least two aligned sections, one of which is rigidly connected to the rotatable armature of the motor, the other section being connected to the first section by an elongated torsion member extending through the compound shaft.

More specifically, it is an object of the present invention to provide a vehicle window regulator comprising an electric motor provided with the compound shaft described in the preceding paragraph in which a worm is connected to the output section of the shaft, a worm gear is provided in mesh with the worm, and an output pinion is rigidly connected to the worm gear adapted for meshing engagement with a toothed sector of a window regulator.

Other objects and features of the invention will become apparent as the description proceeds, especially when taken in conjunction with the accompanying drawing, illustrating a preferred embodiment of the invention.

BRIEF DESCRIPTION OF THE DRAWING

FIGURE 1 is an elevational view of the operating parts of the window regulator.

FIGURE 2 is an enlarged section at one end of the compound shaft.

FIGURE 3 is a fragmentary section on the line 3—3, FIGURE 2.

DESCRIPTION OF THE PREFERRED EMBODIMENT

Referring now to the drawing, the window regulator comprises an output pinion, not shown in detail but including a hub portion 10, the pinion being adapted to run in mesh with a toothed sector of a conventional window regulator for motor vehicles. The pinion, whose hub 10 is splined to a sleeve portion 12 of the worm gear 14 as indicated at 16, is rotatable with the worm gear 14 on a pivot mounting or pin 18.

Rotation is imparted to the worm gear 14 from a worm 20 fixed or otherwise rigidly secured to an output end section 22 of a compound shaft which includes a separate input end section 24. The output shaft section 22 is mounted for rotation independently of the input shaft section 24 in bearings 26. Similarly, the input shaft section 24 is mounted for rotation independently of the output shaft section 22 in bearings 28.

The input shaft section 24 extends through and is fixed to a rotatable armature 30 of an electric motor including field members 32. At its right hand end, as seen in the figure, the input shaft section 24 is recessed as indicated at 34 in FIGURE 2, and receives a ball 36 which constitutes a thrust bearing. The ball 36 engages a thrust plate 38 which is positioned by a fixed abutment 40. A similar construction is provided at the left hand end of the output shaft section 22, the thrust ball bearing being indicated at 42 in engagement with a thrust plate 44 retained in position by an abutment 46.

Torque is transmitted from the input shaft section 24 to the output shaft section 22 by an elongated torsion element 48 which as illustrated, is in the form of a flat spring.

In order to transmit torque from the input shaft section 24 to the output shaft section 22 through the elongated torsion member 48, the end portions of both shaft sections are shaped to provide square corners as indicated at 50 in FIGURE 3, and a U-shaped strip 52 is provided over the end of the shaft as clearly illustrated in FIGURE 3. From this figure it will be observed that rotation imparted to the shaft section 24 by the armature transmits rotation through the engagement with the U-shaped strip 52 to the end of the flat torsion member 48. Identical constructions are provided at both ends.

In practice, the torsion member may have a cross-sectional width of ⅛ inch and a thickness of ¹⁄₃₂ inch. Total maximum deflection of the wire torsion coupling is about 360 degrees and the torque which it is designed to transmit at this maximum deflection may be on the order of 120-ounce inches.

When the window regulator operation is initiated by energizing the motor, the armature 30 commences its rotation and winds up the torsion member 48, thus providing a smooth initial start of movement of the window in either direction and also providing most efficient use of the available power thereby permitting satisfactory operation with a motor having less capacity than would be required if a rigid coupling were provided between the motor and worm.

The drawing and the foregoing specification constitute a description of the improved window regulator with flexible shaft in such full, clear, concise and exact terms as to enable any person skilled in the art to practice the invention, the scope of which is indicated by the appended claims.

What I claim as my invention is:

1. A vehicle window regulator comprising a rotary motor, aligned fully independently rotatable hollow input and output shaft sections, means connecting the input section to said motor, an elongated torsion member extending through said shaft sections and having its ends fixed therein adjacent the remote ends thereof, said torsion member being a wire of rectangular cross-section, the remote ends of said shaft sections including cornered chambers, U-shaped clips engaged over the ends of said wire, firmly engaging opposite sides thereof, and having corners seated in said cornered chambers, a worm on said output shaft section, a worm gear in mesh with said worm and a regulator pinion fixed to said worm gear.

2. A vehicle window regulator comprising a rotary motor, aligned fully independently rotatable hollow input and output shaft sections, means connecting the input section to said motor, an elongated torsion member in the form of a wire of rectangular cross-section extending through said shaft sections and having its ends fixed therein adjacent the remote ends thereof, a pair of ball thrust bearings received in the remote open ends of said shaft sections, and thrust plates engaging said ball thrust bearings beyond the remote ends of said shaft sections, the openings in the remote open ends of said shaft sections being enlarged to provide seats for said ball thrust bearings, a worm on said output shaft section, a worm gear in mesh with said worm and a regulator pinion fixed to said worm gear.

3. A power unit comprising a rotary electric motor, shafting comprising aligned hollow fully independently rotatable input and output shaft sections having their ends in proximity to provide a tubular enclosure, means rigidly connecting the motor to the input shaft section, and an elongated resiliently yieldable torsion member extending through said enclosure and having its ends rigidly connected to substantially separated portions of said shaft sections, said torsion member being in the form of a wire of rectangular cross-section, the remote ends of said shafts including cornered chambers, and U-shaped clips engaged over the ends of said wire, firmly engaging opposite sides thereof, and having corners seated in said cornered chambers.

4. A power unit comprising a rotary electric motor, shafting comprising aligned hollow fully independently rotatable input and output shaft sections having their ends in proximity to provide a tubular enclosure, means rigidly connecting the motor to the input shaft section, an elongated resiliently yieldable torsion member extending through said enclosure and having its ends rigidly connected to substantially separated portions of said shaft sections, a pair of bearings supporting each of said shaft sections, ball thrust bearings received in the remote open ends of said shaft sections, and thrust plates engaging said ball thrust bearings beyond the remote ends of said shaft sections, the openings in the remote open ends of said shaft sections being enlarged to provide seats for said ball thrust bearings.

References Cited

UNITED STATES PATENTS

| | | | |
|---|---|---|---|
| 2,698,526 | 1/1955 | Beier | 64—27 X |
| 2,738,660 | 3/1956 | Gail. | |
| 1,469,424 | 10/1923 | McQuaid et al. | 308—233 |
| 1,780,248 | 11/1930 | Spreen | 308—233 X |
| 2,403,075 | 7/1946 | Green | 74—89.2 X |
| 3,016,723 | 1/1962 | Gondek | 64—27 |
| 3,321,988 | 5/1967 | Peras | 64—27 X |
| 3,369,425 | 2/1968 | Runkle et al. | 287—104 X |

FOREIGN PATENTS 263,229  12/1926  Great Britain.

WILLIAM E. WAYNER, Primary Examiner

U.S. Cl. X.R.

64—27; 287—103